April 25, 1939.  R. HINTON  2,155,547
TRAILER BRAKE
Filed Aug. 16, 1937  2 Sheets-Sheet 2
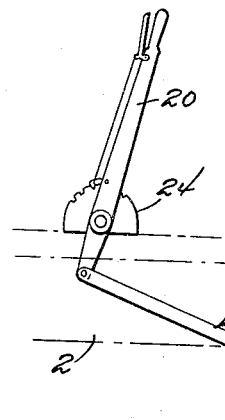
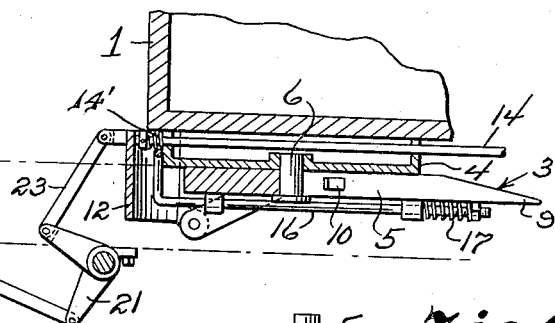
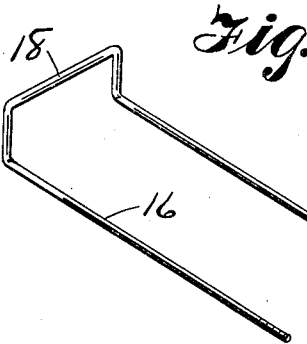
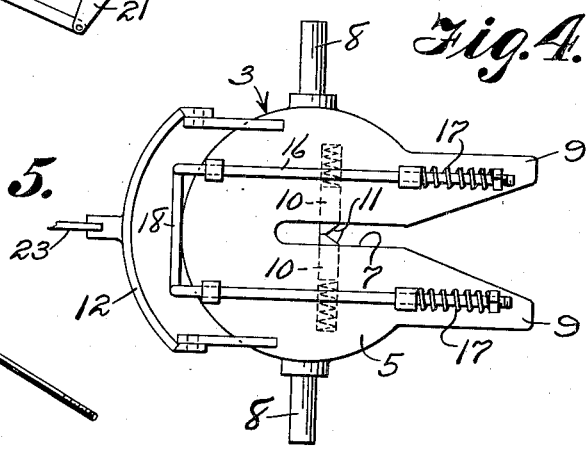
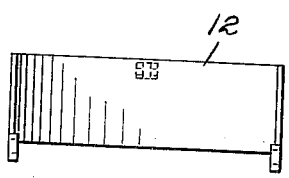
Roy Hinton
INVENTOR
BY Victor J. Evans & Co.
ATTORNEYS Patented Apr. 25, 1939

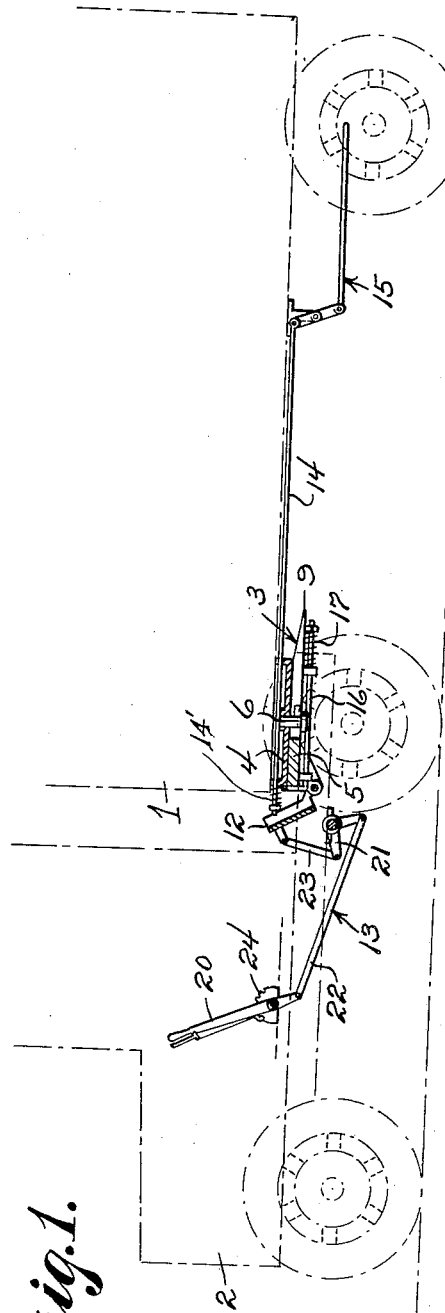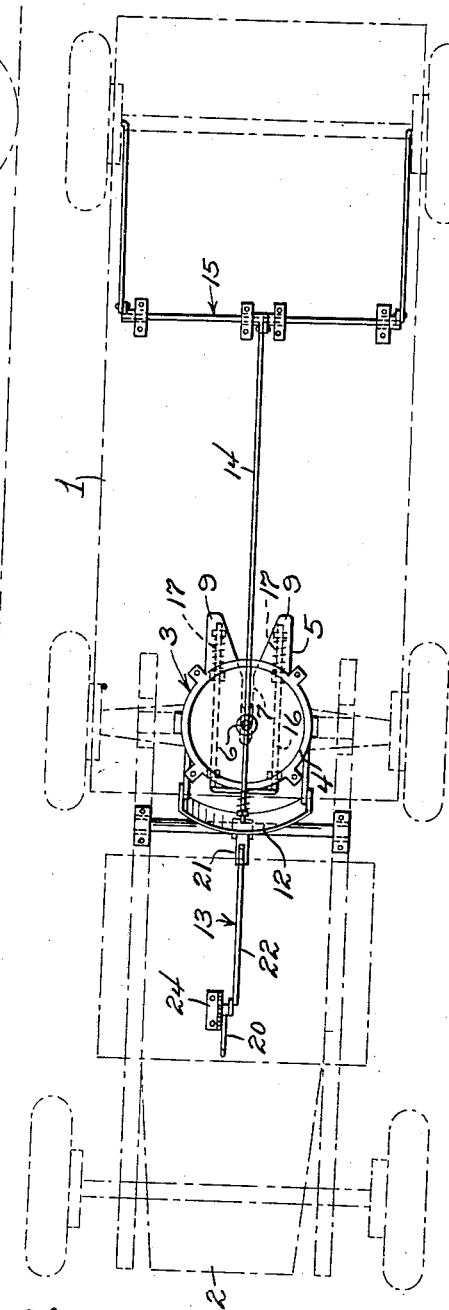

2,155,547

UNITED STATES PATENT OFFICE 2,155,547

TRAILER BRAKE

Roy Hinton, Panhandle, Tex.

Application August 16, 1937, Serial No. 159,386

3 Claims. (Cl. 188—112)

This invention relates to combined couplers and brake operating devices employed on trailers and the towing vehicles therefor and has for the primary object the provision of a device of this character which besides providing a pivotal hitch between a trailer and its towing vehicle it will also automatically apply the brake of the trailer whenever the speed of travel of the latter exceeds the speed of travel of the towing vehicle, thereby maintaining the speed of travel of the trailer and towing vehicle substantially even and which will relieve the towing vehicle of the burden of slowing down the trailer whenever the speed of the towing vehicle is retarded.

With these and other objects in view, this invention consists in certain novel features of construction, combination and arrangement of parts to be hereinafter more fully described and claimed.

For a complete understanding of my invention, reference is to be had to the following description and accompanying drawings, in which:

Figure 1 is a side elevation partly in section showing my invention adapted to a trailer and the towing vehicle therefor.

Figure 2 is a bottom plan view illustrating the same.

Figure 3 is a fragmentary vertical sectional view showing the coupler and the brake operating device.

Figure 4 is a bottom plan view showing the coupler.

Figure 5 is a perspective view illustrating a frame used upon the coupler.

Figure 6 is a front elevation illustrating an abutment plate.

Figure 7 is a top plan view illustrating the same.

Referring in detail to the drawings, the numeral 1 indicates a trailer and 2 a towing vehicle. The trailer is of the two wheel type being partially supported by the towing vehicle and detachably connected thereto by a coupler 3 which consists of coupler plates 4 and 5. The plate 4 is fixed on the trailer and carries a king pin 6 adapted to enter a slot 7 formed on the plate 5, the latter being mounted on the towing vehicle by trunnions 8 fitting in suitable bearings mounted on the towing vehicle. The slot 7 opens outwardly through one edge of the plate 5 and to guide the king pin 6 into the slot 7 finger portions 9 are formed on the plate 5. Spring pressed keeper lugs act to retain the king pin within the slot 7 with a limited endwise movement of the slot. The keeper lugs 10 may be retracted in any well known manner when desiring to free the king pin from the slot, they being beveled, as shown at 11, so that when engaged by the king pin entering the slot will be caused to assume a retracted position. The king pin fitting in the slot 7 with a limited endwise movement of the slot will permit a limited relative movement between the trailer and the towing vehicle.

An abutment plate 12 is pivotally mounted on the plate 5 and has an operating means 13 connected thereto for varying the position of the abutment plate and when said abutment plate is arranged vertically and forwardly of the plates 4 and 5 will be engaged by a spring pressed actuating brake rod 14 connected to the brake rigging 15 of the trailer. The rod 14 extends through a pair of spaced ears formed on the upper face of the plate 4 and is equipped on an end thereof, adjacent the abutment plate 12, with an adjusting nut. Mounted on the rod 14, between said nut and the adjacent ear, is a spring 14' which engages the nut and normally urges the rod towards the abutment plate 12 to release the brakes of the trailer. However, when the speed of the trailer exceeds the speed of the towing vehicle the brake rod 14 is caused to slide rearwardly by abutting the abutment plate and thereby bring about the application of the trailer brakes. The abutment plate 12 may have its position varied with respect to the forward end of the brake rod 14 by the operating mechanism 13 and also may be positioned entirely out of the path of the brake rod 14, this being desirable when desiring to back the trailer by the towing vehicle and which prevents the application of the trailer brakes during the backing of the trailer. The operating lever of the control mechanism 13 is located in the driver's compartment of the towing vehicle so that the mechanism 13 can be conveniently operated by the driver.

A frame 16 is slidably mounted on the plate 5 and is spring influenced by springs 17. One end of the frame 16 is offset, as shown at 18, to engage with the plate 4 so that when the plate 4 shifts relative to the plate 5 the frame will be slid against the sections of the springs tensioning said springs so that they will aid in bringing the plate 4 in alignment with the plate 5 when the speed of the trailer and towing vehicle is substantially equal. The abutment plate 12 is arcuately curved so that the brake rod 14 will remain in engagement therewith whenever there is a relative turning movement between the trailer and the towing vehicle.

The operating mechanism 13 consists of a control lever 20 connected to a bell crank lever 21 by a link 22. The bell crank lever is connected to the abutment plate by a link 23. The control lever is pivotally mounted on a rack member 24 and is equipped with a manually operated pivoted dog for engagement between a pair of selected teeth on said rack to secure the mechanism 13 and plate 12 in adjusted position.

Having described the invention, I claim:

1. A device of the character set forth comprising a coupler for detachably connecting a trailer to a towing vehicle and adapted to permit a limited sliding movement of the trailer relative to the towing vehicle and permitting the trailer and towing vehicle to pivot relative to each other, a brake rod connected to a brake mechanism of the trailer and slidably supported by the coupler, an adjustable abutment plate carried by the coupler to operate the brake rod and thereby bring about application of the trailer brake when the speed of the trailer exceeds the speed of the towing vehicle, and means adaptable for operation from a remote position on said towing vehicle for adjusting the abutment plate and for retaining the latter in any of its adjusted positions and permitting the abutment plate to be moved entirely out of the path of movement of the brake rod to permit backing movement of said trailer by said towing vehicle.

2. A device of the character described comprising a coupler for detachably and pivotally connecting a trailer onto a towing vehicle and permitting said trailer to have a limited sliding movement relative to said towing vehicle and including plates one secured to the trailer and the other secured on the towing vehicle and the latter having means for receiving a king pin carried by the plate of the trailer, a brake operating rod slidably supported by the plate on the trailer and connected to a brake mechanism of the trailer, a spring acting on said rod to normally position the latter to release the brakes, a curved abutment plate pivoted on the plate carried by the towing vehicle and normally positioned within the path of movement of said rod for actuating said brake mechanism, and a control mechanism connected to said abutment plate and adaptable for operation from a remote position on said towing vehicle for moving said abutment plate out of the path of movement of said rod to permit backing movement of said trailer by said towing vehicle.

3. A device of the character set forth comprising a coupler for detachably and pivotally connecting a trailer onto a towing vehicle and permitting said trailer to have a limited sliding movement relative to said towing vehicle and including plates, one secured to the trailer and the other secured on the towing vehicle and the latter having means for receiving a king pin carried by the plate of the trailer, a brake operating rod slidably supported by the plate on the trailer and connected to a brake mechanism of the trailer, a spring acting on said rod to normally position the latter to release the brakes, a curved abutment plate pivoted on the plate carried by the towing vehicle, a control mechanism connected to said abutment plate and adaptable for operation from a remote position on said towing vehicle for varying the positions of said abutment plate relative to said brake operating rod, and a tension frame slidably supported on the plate carried by the towing vehicle and engaging the plate secured on the trailer for normally maintaining said first mentioned plates in adjusted position relative to each other.

ROY HINTON.